(12) United States Patent
Dwyer et al.

(10) Patent No.: US 9,658,244 B2
(45) Date of Patent: May 23, 2017

(54) REDUCING HYSTERESIS EFFECTS IN ACCELEROMETER

(71) Applicant: Honeywell International Inc., Morristown, NJ (US)

(72) Inventors: Paul W. Dwyer, Seattle, WA (US); William Lee, Redmond, WA (US)

(73) Assignee: Honeywell International Inc., Morris Plains, NJ (US)

( * ) Notice: Subject to any disclaimer, the term of this patent is extended or adjusted under 35 U.S.C. 154(b) by 165 days.

(21) Appl. No.: 14/326,224

(22) Filed: Jul. 8, 2014

(65) Prior Publication Data
US 2016/0011229 A1    Jan. 14, 2016

(51) Int. Cl.
| G01P 15/13 | (2006.01) |
| G01P 15/125 | (2006.01) |
| B32B 37/18 | (2006.01) |
| B32B 37/12 | (2006.01) |

(Continued)

(52) U.S. Cl.
CPC ............ *G01P 15/125* (2013.01); *B32B 37/12* (2013.01); *B32B 37/18* (2013.01); *G01P 1/006* (2013.01); *G01P 15/132* (2013.01); *B32B 2037/1253* (2013.01); *B32B 2307/546* (2013.01);

(Continued)

(58) Field of Classification Search
None
See application file for complete search history.

(56) References Cited

U.S. PATENT DOCUMENTS 3,702,073 A  *  11/1972  Jacobs .................. G01P 15/132
                                                             73/514.23
4,250,757 A  *   2/1981  Hanson ..................... G01D 5/24
                                                             73/514.23

(Continued)

FOREIGN PATENT DOCUMENTS

EP            2722676 A1     4/2014
WO      WO 86/00143 A1       1/1986

(Continued)

OTHER PUBLICATIONS

Extended Search Report from counterpart European Application No. 15171508.3, dated Sep. 22, 2015, 6 pp.

(Continued)

*Primary Examiner* — Jill Culler
(74) *Attorney, Agent, or Firm* — Shumaker & Sieffert, P.A.

(57) ABSTRACT

Techniques of manufacturing an accelerometer as disclosed herein include positioning an accelerometer between a first stator and a second stator, and the accelerometer comprises a plurality of features. In some examples, the plurality of features include a proof mass, a support structure defining a plane and configured to support the proof mass, a flexure configured to flexibly connect the proof mass to the support structure, and a plurality of raised pads, the plurality comprising at least one raised pad positioned between the flexure and an exterior of the support structure, wherein the at least one raised pad is configured to be isolatable. Techniques of manufacturing the accelerometer as disclosed herein further include compressing the first stator and the second stator onto the accelerometer, attaching a bellyband to the first stator and the second stator, and isolating the at least one raised pad.

9 Claims, 7 Drawing Sheets

(51) Int. Cl.
*G01P 1/00* (2006.01)
*G01P 15/08* (2006.01)

(52) U.S. Cl.
CPC .......... *B32B 2457/00* (2013.01); *G01P 15/13* (2013.01); *G01P 2015/0828* (2013.01)

(56) References Cited

U.S. PATENT DOCUMENTS

| | | | |
|---|---|---|---|
| 4,592,234 A * | 6/1986 | Norling | G01P 15/132 |
| | | | 73/497 |
| 4,697,455 A | 10/1987 | Norling | |
| 4,736,629 A | 4/1988 | Cole | |
| 4,872,342 A | 10/1989 | Hanson et al. | |
| 4,932,258 A * | 6/1990 | Norling | G01P 15/132 |
| | | | 73/497 |
| 5,085,079 A * | 2/1992 | Holdren | G01P 15/132 |
| | | | 73/514.13 |
| 5,090,243 A | 2/1992 | Holdren et al. | |
| 5,095,749 A | 3/1992 | Hanson | |
| 5,287,744 A | 2/1994 | Norling et al. | |
| 5,289,719 A | 3/1994 | Egley et al. | |
| 5,535,902 A | 7/1996 | Greiff | |
| 5,600,067 A | 2/1997 | Rupnick et al. | |
| 5,693,882 A | 12/1997 | Stratton | |
| 5,763,779 A * | 6/1998 | Foote | G01P 15/132 |
| | | | 73/497 |
| 5,905,201 A | 5/1999 | Petri | |
| 5,962,784 A | 10/1999 | Hulsing, II | |
| 5,969,250 A | 10/1999 | Greiff | |
| 6,389,899 B1 | 5/2002 | Partridge et al. | |
| 6,912,902 B2 | 7/2005 | Malametz et al. | |
| 7,541,214 B2 | 6/2009 | Wan | |
| 8,528,405 B2 * | 9/2013 | Jenkins | G01P 15/0802 |
| | | | 257/E21.214 |
| 8,584,522 B2 | 11/2013 | Acar et al. | |
| 2002/0170355 A1 * | 11/2002 | Malametz | B81B 3/0072 |
| | | | 73/514.29 |
| 2014/0109673 A1 | 4/2014 | Roehnelt et al. | |
| 2014/0290364 A1 * | 10/2014 | Levy | G01P 1/006 |
| | | | 73/514.37 |

FOREIGN PATENT DOCUMENTS

| | | |
|---|---|---|
| WO | WO 87/06350 A1 | 10/1987 |
| WO | 9951991 A1 | 10/1999 |

OTHER PUBLICATIONS

Peters, R. B et al. "Development of a 125 g Quartz Flexure Accelerometer for the RIMU Program." Apr. 1998. AlliedSignal Electron. & Avionics Syst., Redmond, WA, USA. 8 pp.

Response to Extended Search Report dated Jan. 18, 2016, from counterpart European Application No. 15171508.3, filed Jun. 21, 2016, 26 pp.

* cited by examiner

REDUCING HYSTERESIS EFFECTS IN ACCELEROMETER

TECHNICAL FIELD

The disclosure relates to accelerometers.

BACKGROUND

Accelerometers function by detecting the displacement of a proof mass under inertial forces. An accelerometer assembly may, for example, detect the displacement of a proof mass by a capacitive pick-off system. In this example, a capacitor plate may be deposited on the upper surface of the proof mass, and a similar capacitor plate may be deposited on the lower surface of the proof mass. The capacitor plates cooperate with the inwardly facing surfaces of upper and lower stators to provide the capacitive pick-off system. Additionally, a force-rebalancing system may be used to detect the displacement of the proof mass, where coil forms with force-rebalance coils are mounted on either side of the proof mass. The force-rebalance coils cooperate with permanent magnets in the upper and lower stators and with a suitable feedback circuit to retain the proof mass at a predetermined position (i.e., a null position) with respect to the support structure. Thin film leads on the lower surface of the accelerometer provide electrical connections to the capacitor pick-off plates and force-rebalance coils. Acceleration applied to the accelerometer assembly may be determined by electronics based on the change in capacitance with respect to the capacitor plates or the current increase in the force-rebalance coils to maintain the proof mass in the null position.

SUMMARY

In general, this disclosure is directed to techniques and devices that may reduce hysteresis (i.e., the inability to return to a null position) in the acceleration measurement of an accelerometer assembly, by reducing the impact of the forces and/or strains on a proof mass in the accelerometer assembly. For example, hysteresis in an accelerometer assembly may be the deflection or strain within the accelerometer assembly after forces and/or thermal strains have been applied to the accelerometer assembly and then removed. The strains in the accelerometer assembly may accumulate due to thermal coefficient of expansion mismatches and non-elastic behavior of epoxy bond joints under load. For example, an accelerometer configured in accordance with the techniques of this disclosure may include a plurality of raised pads, which may be configured to isolate the strain of the stators and bellybands from the accelerometer. In one example, a raised pad with pad flexures between the flexures of the proof mass and the exterior of the support structure may mechanically isolate the forces and/or strains from the bending of the stators caused by the heating and cooling of the stators. In another example, after the accelerometer assembly is assembled, the raised pad between the flexures of the proof mass and the exterior of the support structure may be removed to completely isolate the flexures of the proof mass from that portion of the stators.

In another example, the disclosure is directed to a method of manufacturing an accelerometer assembly, the method comprising positioning an accelerometer between a first stator and a second stator, wherein the accelerometer comprises a plurality of features including a proof mass, a support structure defining a plane and configured to support the proof mass, a flexure configured to flexibly connect the proof mass to the support structure, and a plurality of raised pads, the plurality comprising at least one raised pad positioned between the flexure and an exterior of the support structure, wherein the at least one raised pad is configured to be isolatable, compressing the first stator and the second stator onto the accelerometer, attaching a bellyband to the first stator and the second stator, and isolating the at least one raised pad.

In another example, the disclosure is directed to a device comprising a proof mass, a support structure surrounding the proof mass defining a plane and configured to support the proof mass, a flexure connecting the proof mass to the support structure, wherein the flexure allows the proof mass to move about the plane defined by the support structure, and a plurality of raised pads, wherein at least one raised pad is positioned between the flexure and an exterior of the support structure, and wherein the at least one raised pad is configured to be isolatable, wherein the device is comprised of a monolithic material.

In one example, the disclosure is directed to a method of manufacturing an accelerometer, the method comprising masking a material with a photoresist to define a plurality of features, the plurality of features comprising a proof mass, a support structure defining a plane and configured to support the proof mass, a flexure configured to flexibly connect the proof mass to the support structure, and a plurality of raised pads, the plurality of raised pads comprising at least one raised pad positioned on the support structure and between the flexure of the proof mass and an exterior of the support structure, wherein the at least one raised pad is configured to be isolatable, and processing the material to form the plurality of features on the material.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
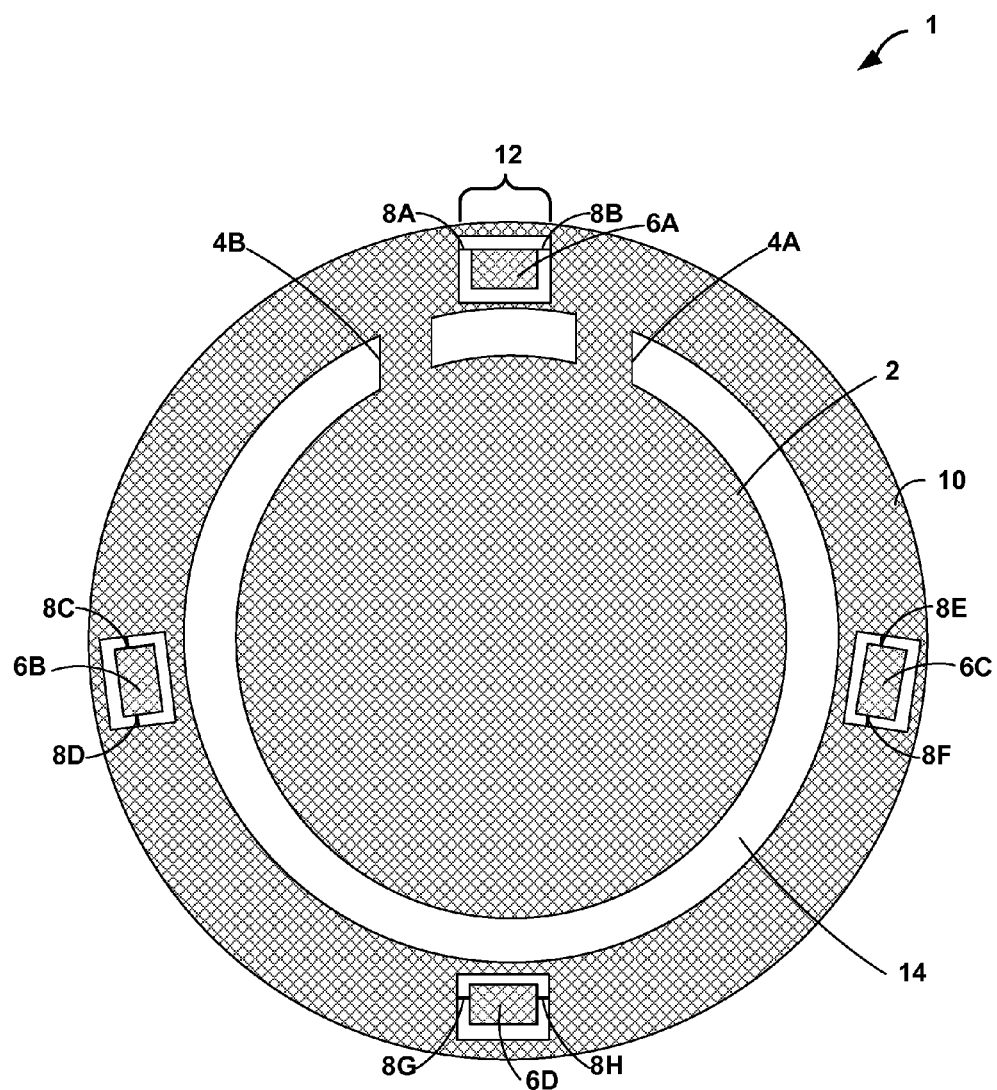
FIG. 1 is a conceptual diagram illustrating a top view of an accelerometer, in accordance with the techniques described herein.

Navigation systems and positioning systems rely on the accuracy of accelerometers to perform operations. Hysteresis (i.e., the inability to return to a null position) in accelerometers may cause errors to accumulate in the location or positional information of the systems which can compromise the operations of the systems. An accelerometer assembly measures acceleration of the accelerometer itself with respect to an inertial reference frame. An accelerometer assembly with stators (e.g., magnetic structures) above and below the accelerometer may form a capacitive pick-off system. For example, as the proof mass is displaced by acceleration of the accelerometer assembly, the change in capacitance of the capacitor plates on the top and bottom of the proof mass can be used by the accelerometer assembly to determine the displacement of the proof mass. The amount of displacement of the proof mass from a null position may be proportionate to the magnitude of the acceleration incident upon the accelerometer. Additionally or alternatively, the accelerometer assembly with stators above and below the accelerometer and force-rebalance coils located on either side of the proof mass may form a force-rebalancing system. For example, the force from the acceleration of the accelerometer assembly, will attempt to displace the proof mass. The current in the force-rebalance coils will be increased by a servo to maintain the null position of the proof mass by driving the differential capacitance from the pick-offs to zero. The current increase in the force-rebalance coils provides the opposite force required for maintaining the null position of the proof mass, and the increase in current will be proportional to the applied acceleration.

The accuracy of some accelerometers may depend on ideal conditions during construction. For example, under ideal conditions the material of the accelerometer (e.g., quartz or silicon) and stators in an accelerometer assembly are perfectly flat and no strains would be generated when the stators and the accelerometer are compressed together during assembly. Under normal manufacturing conditions, however, the material of the accelerometer and the stators are typically not perfectly flat. In other words, the accelerometer is compressed by the stators (e.g., metal magnetic structures) during assembly, and strains are placed on the accelerometer, which may change the position of the proof mass within the accelerometer, causing hysteresis in the accelerometer assembly. Further, the compression forces will remain on the accelerometer as a bellyband may be applied to keep the accelerometer and the stators compressed together to form the accelerometer assembly.

The accuracy of some accelerometers may also be limited by hysteresis and bias instabilities (i.e., a change in the physical structure of the accelerometer assembly) caused by thermal strains. For example, the bias instabilities may be created during the construction process of an accelerometer assembly, in particular the heating and cooling processes, and may include changes in the proof mass position of the accelerometer and/or the capacitive gaps between the proof mass of the accelerometer and the stators of the accelerometer assembly. For example, stators, bellybands, and epoxies of an accelerometer assembly may have different thermal expansion coefficients than the materials of the accelerometer, and the stators and bellybands may change their physical structure with respect to the accelerometer after being heated and/or cooled.

Compression forces from clamping an accelerometer assembly and/or thermal strains (e.g., tension or compression forces) caused by heating and/or cooling of the accelerometer assembly during construction may be indistinguishable from an applied acceleration. For example, a compression force applied to an accelerometer may cause the proof mass of the accelerometer to be displaced, which may be indicative of acceleration even though no acceleration has occurred. In some examples, thermal strains created and relieved during the heating and/or cooling of the accelerometer assembly during construction may cause the proof mass of the accelerometer to be displaced or may change the distance of the capacitive gap between the proof mass and the stators of the accelerometer assembly, which may be indicative of acceleration even though no acceleration has occurred. In other examples, compression forces and/or thermal strains may permanently change the physical structure of the accelerometer assembly, which may cause the proof mass of the accelerometer to be displaced or may change the distance of the capacitive gap between the proof mass and the stators of the accelerometer assembly, which may be indicative of acceleration even though no acceleration has occurred.

Forces and/or strains placed on the accelerometer assembly during construction may cause of permanent change in the physical structure of the accelerometer assembly. After construction, stabilization, and thermal modeling of the accelerometer assembly is complete, the original model of the accelerometer assembly may no longer accurately represent the behavior of the accelerometer assembly if large stresses are slowly relieving. To prevent the forces and/or strains from causing a physical change, techniques and devices are disclosed herein that may prevent and minimize hysteresis (i.e., the inability of an accelerometer to successfully return to a null position) due to forces and/or strain placed on the accelerometer assembly during construction, which may result in non-acceleration-dependent changes to the proof mass position and the capacitive gaps. For example, an accelerometer configured in accordance with the techniques of this disclosure may include a plurality of raised pads on the accelerometer to isolate the proof mass from the stators.

In some examples, the raised pads may be configured with pad flexures that are thin in the radial direction and stiff in the circumferential and vertical directions in order to isolate and minimize the forces and/or strains placed on the accelerometer by the stators and bellybands during construction. In some examples, at least one of the plurality of raised pads may be configured to be removable by clipping the pad flexures of the at least one raised pad. In some examples, the at least one raised pad configured to be removable enables the at least one raised pad to provide mechanical isolation of forces and/or strains during construction through the pad flexures. In some examples, the at least one raised pad configured to be removable prevents the stators from changing the capacitive gap between the proof mass and the stators of the accelerometer assembly. Moreover, removing the at least one raised pad after construction provides further isolation of the proof mass from the stators, and reduces the likelihood forces and/or strains from the stators may displace the proof mass. Accelerometers that use a plurality of raised pads during construction and at least one raised pad isolated after construction may provide a more accurate acceleration measurement after construction due to a reduction in hysteresis. It should be understood as disclosed herein that isolated means having little to no contact, and in some examples, significantly removed or eliminated.

Accelerometers configured in accordance with techniques of this disclosure may be created with a single material, which may reduce the impact of the heating and cooling process during construction, as monolithic (e.g., single material) accelerometers have one expansion coefficient. That is, such accelerometers may be less subject to bias instabilities and may be more stable as compared to conventional accelerometers. Furthermore, the assembly techniques of this disclosure may allow for more accurate accelerometer assemblies with a smaller profile and with reduced costs as the needs for preventing forces and/or strains from construction and other materials is significantly diminished.

FIG. 1 is a conceptual diagram illustrating a top view of an accelerometer configured in accordance with the techniques described herein. In the example of FIG. 1, accelerometer 1 includes proof mass 2, flexures 4A and 4B, raised pads 6A-6D, pad flexures 8A-8H, support structure 10, zone 12, and channel 14.

Proof mass 2 is configured to move out of the plane as defined by support structure 10 in response to an acceleration of accelerometer 1. In some examples, proof mass 2 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, proof mass 2 is made of a silicon material. In some examples, proof mass 2 may contain C-shaped capacitor plates (not shown) on the top and the bottom of proof mass 2, which may provide a center of capacitance, and increases and decreases in capacitance at capacitive gaps with stators (not shown) as proof mass 2 is displaced.

Flexures 4A and 4B (collectively "flexures 4") flexibly connect proof mass 2 to support structure 10 and supports proof mass 2 within support structure 10. In some examples, flexures 4 are made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, flexure 4 is made of a silicon material. In some examples, flexures 4 may enable proof mass 2 to move about the plane defined by support structure 10 due to acceleration of accelerometer 1. For example, flexures 4 may be stiff in radial direction and flexible in vertical direction, and flexures 4 may allow proof mass 2 to be displaced out of the plane as defined by support structure 10.

Raised pads 6A-6D separate proof mass 2 from stators (not shown). In some examples, the height of raised pads 6A-6D may define the capacitive gaps (not shown) between the stators and proof mass 2. In some examples, the height of raised pads 6A-6D may be between half of one-thousandth to one-thousandth of an inch. In some examples, raised pads 6A-6D may be on both sides of support structure 10. In some examples, raised pads 6A-6D may receive the forces and/or strains from the stators caused by construction of the accelerometer assembly.

In some examples, raised pads 6A-6D are made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, raised pads 6A-6D are made of a silicon material. In some examples, raised pads 6A-6D may enable proof mass 2 to be mechanically isolated from forces and/or strains caused during construction. It should be understood as disclosed herein that mechanically isolated or isolated means little or no contact, and in some examples, significantly removed or eliminated. For example, pad flexures 8A-8H as described below may provide mechanical isolation between support structure 10 and raised pads 6A-6D, thereby providing mechanical isolation between proof mass 2 and stators (not shown). In some examples, raised pads 6A-6D may provide frictional forces to the stators (not shown) and prevent the stators from shifting or slipping during construction of an accelerometer assembly (not shown).

Pad flexures 8A-8H flexibly connect raised pads 6A-6D to support structure 10 and support raised pads 6A-6D within support structure 10. In some examples, pad flexures 8A-8H are made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, pad flexures 8A-8H are made of a silicon material. In some examples, pad flexures 8A-8H are thin in the radial direction and stiff in the circumferential and vertical directions, which may enable pad flexures 8A-8H to mechanically isolate support structure 10 and proof mass 2 from the strain placed on raised pads 6A-6D. In some examples, the height of pad flexures 8C-8H may be around thirty thousandths of an inch (e.g., 0.030 inch). In some examples the height of pad flexures 8A and 8B may vary between thirty thousandths and one thousandth of an inch (e.g., 0.030 to 0.001 inch) depending on the amount of isolation required in the area of raised pad 6A.

In some examples, pad flexures 8A and 8B may be configured to be removable. For example, pad flexures 8A-8H may be made accessible during construction. In some examples, pad flexures 8A and 8B may be removed by laser trimming. In other examples, pad flexures may be removed by mechanical means, such as clipping. In some examples, where raised pad 6A may be connected to support structure 10 by pad flexures 8A and 8B directly above raised pad 6A at the exterior of support structure 10, pad flexures 8A and 8B may be removed (e.g., snapped off) by a flat-blade tweezer.

Support structure 10 provides support to proof mass 2 through flexures 4, support to raised pads 6A-6D through pad flexures 8A-8H, and may contain strains which may also displace proof mass 2. In some examples, support structure 10 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, support structure 10 is made of a silicon material. In some examples, support structure 10 may define a plane in which proof mass 2, flexures 4, and pad flexures 8A-8H are also located. In some examples, support structure 10 is a piece of monolithic material with a plurality of features etched to form accelerometer 1. In some examples, support structure 10 consists essentially of quartz or silicon. Although support structure 10 as shown in FIG. 1 is a circular shape, it is contemplated that support structure 10 may be any shape (e.g., square, rectangular, oval, or the like).

Zone 12 is a part of support structure 10 and is configured to be removable and allow access to pad flexures 8A and 8B. In some examples, zone 12 may be removed by laser trimming. In some examples, zone 12 allows the removal of pad flexures 8A and 8B. Channel 14 is configured to allow the displacement of proof mass 2 during acceleration. In some examples, channel 14 is cut by a carbon-dioxide laser.

In the example of FIG. 1, raised pads 6A-6D are located between proof mass 2 and the exterior of support structure 10 are connected by pad flexures 8A-8H. In particular, raised pad 6A is located between the exterior of support structure 10 and flexures 4. Although not shown in FIG. 1, in some examples, stators may surround accelerometer 1 and may be attached to support structure 10 through raised pads 6A-6D and pad flexures 8A-8H.

Raised pads 6A-6D may isolate the forces and/or strains on accelerometer 1 by, for example, having pad flexures 8A-8H that are thin in the radial direction and stiff in the circumferential and vertical directions. In some examples, pad flexures 8A-8H may isolate raised pads 6A-6D to allow the stators to expand radially over temperature while transmitting less strain to support structure 10, where the strain would cause the capacitors to move and create bias. In some examples, raised pad 6A may support the stators during the construction of the accelerometer assembly, which prevents the stators from bending closer together from the compressive force applied by the bellyband. In some examples, the compressive force is caused by the higher thermal coefficient of expansion of the bellyband than the thermal coefficient of expansion of the quartz/invar stack, which the bellyband is attached to. For example, when the bellyband cools from the elevated cure temperature of the epoxy, the bellyband shrinks more than the quartz/invar stack and puts the quartz/invar stack into compression. In some examples, where the stators have no support, the stators, which comprise the ground plane of the differential capacitors, may bend, producing bias.

In some examples, mechanical isolation of forces and/or strains can be made during construction, and after construction the flexures connecting raised pad 6A between flexures 4 and the exterior of support structure 10 may be removed to provide further isolation of proof mass 2. In instances where it is desired to increase or decrease the amount of mechanical isolation, raised pads 6A-6D may be isolated to an adjustable degree by use of pad flexures 8A-8H. In other words, where it is desired to increase the amount of mechanical isolation of a raised pad, pad flexures may be very thin circumferential flexures connecting a raised pad to a support structure (e.g., pad flexures 8A and 8B connecting corners of a rectangular raised pad 6A to support structure 10). It should be understood as disclosed herein that mechanically isolated or isolated means little or no contact, and in some examples, significantly removed or eliminated.

Accelerometer 1 may be configured in accordance with techniques of this disclosure to provide for a better accelerometer assembly, which may enable the electronics to better determine the acceleration of accelerometer 1. In general, an accelerometer assembly includes forces and/or strains, expansion coefficients, and epoxies, which will change their state over time, causing hysteresis during the heating and cooling processes of construction. However, as the state of the accelerometer assembly changes, pad flexures 8A-8H of raised pads 6A-6D help reduce the hysteresis caused during construction. By providing pad flexures 8A-8H with raised pads 6A-6D, and in particular raised pad 6A with pad flexures 8A and 8B, there will be a reduction in the impact of having to calibrate the accelerometer assembly after construction. Moreover, raised pads 6A-6D may prevent the stators (not shown) from bending during construction, which may provide a more accurate capacitive gap between the stators and proof mass 2, and a better determination of the actual acceleration of accelerometer assembly after construction instead of having to compensate for changes in the capacitive gaps. It is contemplated in this disclosure that raised pads 6A-6D may be located and/or oriented anywhere on accelerometer 1 that strain isolation is desired. It is contemplated in this disclosure that various raised pads 6A-6D may be configured to be removable from accelerometer 1.

Figure 2:
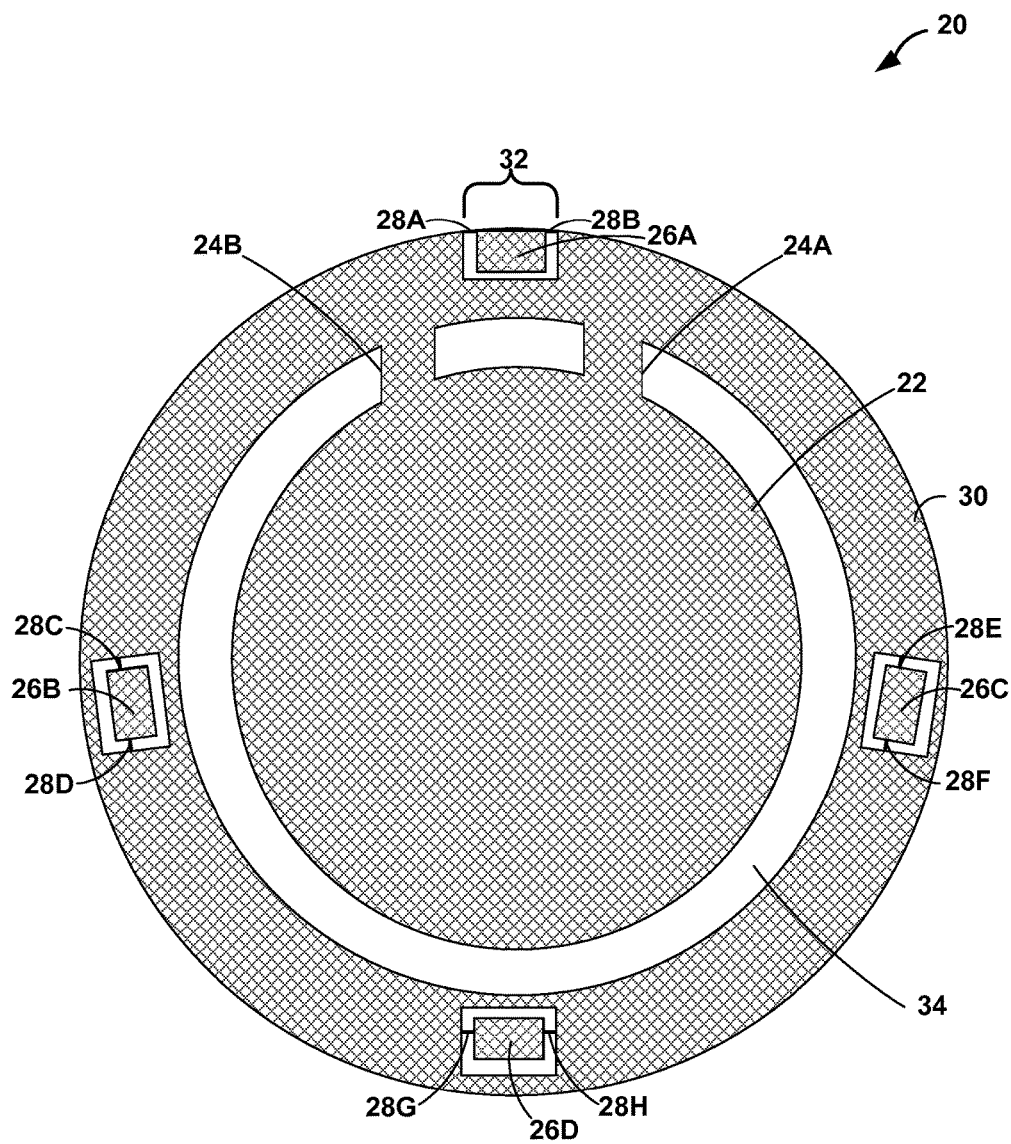
FIG. 2 is a block diagram illustrating another top view of an accelerometer, in accordance with the techniques described herein.

FIG. 2 is a conceptual diagram illustrating an example top view of accelerometer 20, in accordance with the techniques described herein. In the example of FIG. 2, accelerometer 20 includes proof mass 22, flexures 24A and 24B, raised pads 26A-26D, pad flexures 28A-28H, support structure 30, zone 32, and channel 34, which may correspond to proof mass 2, flexures 4, raised pads 6A-6D, pad flexures 28A-28H, support structure 10, zone 12, and channel 14 respectively, as described in FIG. 1.

In the example of FIG. 2, pad flexures 28A and 28B may be a thin portion of quartz material located at the edge of the exterior of support structure 30. In the example of FIG. 2, raised pad 26A via pad flexures 28A and 28B may be located near the exterior of support structure 30. In some examples, pad flexures 28A and 28B may be thin in the radial direction and stiff in the circumferential and vertical directions. In some examples, pad flexures 28A and 28B may be configured to be removed. For example, zone 32 may be targeted by a laser or any mechanical means (not shown) to break or clip flexures 28A and 28B to isolate raised pad 26A. In some examples, raised pad 26A may be removed to provide further isolation of flexures 24A and 24B and proof mass 2 from the stators (not shown). In some examples, flexures 28A and 28B may have a thickness between one and third millimeters depending on the degree of isolation required for good performance Although support structure 30 as shown in FIG. 2 is a circular shape, it is contemplated that support structure 30 may be any shape (e.g., square, rectangular, oval, or the like).

Figure 3:
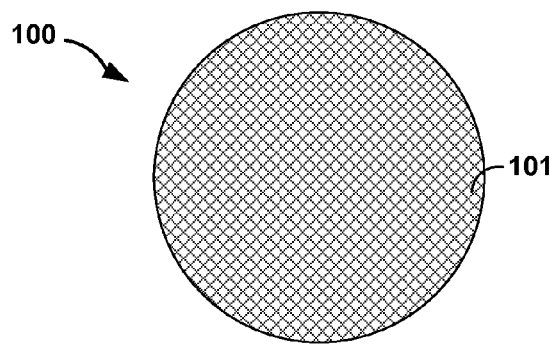
FIG. 3 is illustrating an example of a material in the process of forming an accelerometer, in accordance with the techniques described herein.

FIG. 3 is illustrating an example of material 101 in the process of forming accelerometer 100, in accordance with the techniques described herein. In the example of FIG. 3, accelerometer 100 (e.g., accelerometer 1 or 20 as described in FIGS. 1 and 2) is a single piece of material 101 (e.g., crystalline quartz substrate or silicon). In the example of FIG. 3, material 101 may have a shape with the same diameter or width as support structure 10 as described in FIG. 1. Although support structure 10 as shown in FIG. 1 is a circular shape, it is contemplated that support structure 10 and material 101 may be any shape (e.g., square, rectangular, oval, or the like). In some examples, material 101 may be thirty thousandths of an inch thick. In some examples, the height of material 101 may be similar to the height of the raised pads, which may define the capacitive gaps between accelerometer 100 and the stators (not shown). In some examples, the height of a plurality of raised pads (e.g., raised pads 6A-6D and 26A-26D) may be about half of one-thousandth to one-thousandth of an inch (e.g., 0.0005 to 0.001 inches). As described below, FIGS. 4A and 5A are one example of the process of forming accelerometer 100, and FIGS. 4B and 5B are another example of the process of forming accelerometer 100.

Figure 4A:
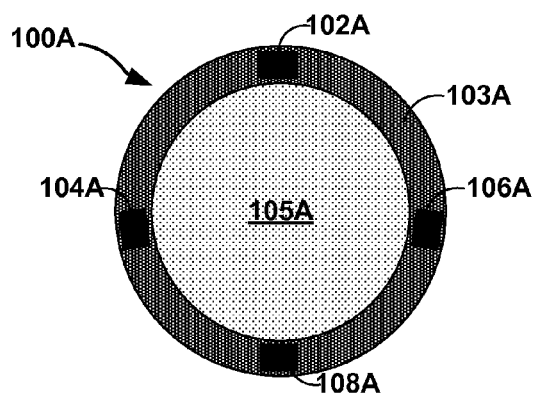
FIGS. 4A-4B are illustrating examples of a material in the process of forming an accelerometer, in accordance with the techniques described herein.
Figure 4B:
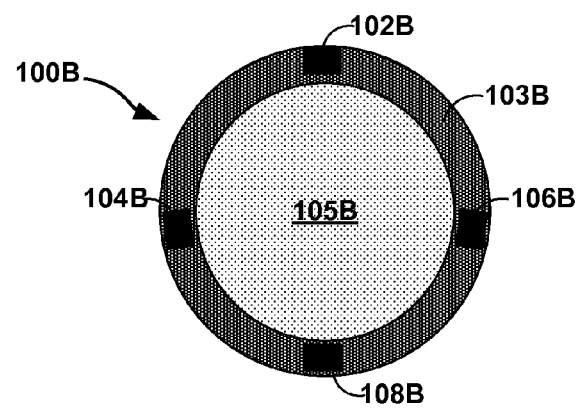
Figure 5A:
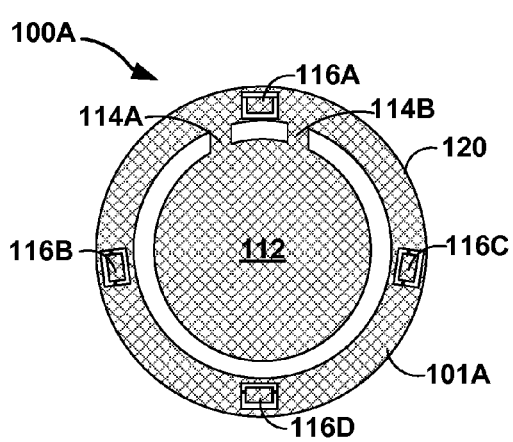
FIGS. 5A-5B are illustrating examples of a material in the process of forming an accelerometer, in accordance with the techniques described herein.
Figure 5B:
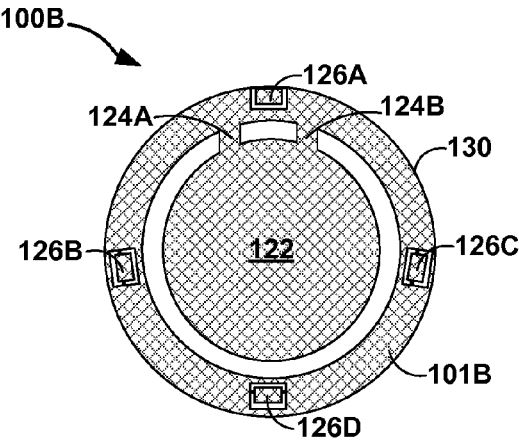

FIGS. 4A and 5A are illustrating examples of material 101A in the process of forming accelerometer 100, in accordance with the techniques described herein. FIGS. 4A-5A are described with respect to FIG. 1. In the example of FIG. 4A, accelerometer 100A may be masked with one or more photoresists to define (e.g., outline the structure) support structure 103A, interior of support structure 105A, and areas 102A-108A. Support structure 103A may have a mask which allows for a shallow acid etch. In some examples, the photoresist mask defining support structure 103A may be a silk screen vinyl material. Interior of support structure 105A may have a mask which allows for a deep acid etch. In some examples, the photoresist mask defining interior of support structure 105A may be a silicon rubber material. Areas 102A-108A may be the location of a plurality of raised pads (e.g., raised pads 6A-6D). In some examples, areas 102A-108A may have a mask that prevents or at least significantly limits any acid etch. In some examples, accelerometer 100A with the photoresist masks defining support structure 103A, interior of support structure 105A, and areas 102A-108A, accelerometer 100A may be exposed to acid to remove (e.g., etch) material from accelerometer 100A. Removing material forms a thickness of support structure 103A (e.g., around twenty-nine thousandths of an inch), a thickness of interior of support structure 105A (e.g., around one thousandths of an inch), and a thickness of areas 102A-108A (e.g., around thirty thousandths of an inch) which may be the combined height of the plurality of raised pads on both sides of the proof mass.

In the example of FIG. 5A, accelerometer 100A may be placed in a fixture and a carbon-dioxide laser may be programmed to process a plurality of features on material 101A, which may include proof mass 112, flexures 114A and 114B, raised pads 116A-116D, and support structure 120, and correspond to proof mass 2, flexures 4, raised pads 6A-6D, and support structure 10 respectively as described in FIG. 1. In other examples, material 101A may have a photoresist masking the plurality of features to be exposed to light to remove (e.g., etch) material from material 101A to form accelerometer 100a (e.g., accelerometer 1) with the plurality of features. For example, accelerometer 100A may be exposed to light from proof mass 112, flexures 114A and 114B, raised pads 116A-116D, and support structure 120, which may correspond to proof mass 2, flexures 4, raised pads 6A-6D, and support structure 10 respectively as described in FIG. 1.

In the example of FIG. 5A, raised pads 116A-116D may further include a pair of pad flexures which may correspond to pad flexures 8A-8H as described in FIG. 1, and a channel between raised pads 116A-116D and support structure 120 to isolate raised pads 116A-116D from support structure 120, flexures 114A and 114B, and proof mass 112. In the example of FIG. 5A, proof mass 112 may be connected to support structure 120 by flexures 114A and 114B, which may correspond to flexures 4 as described in FIG. 1, and a channel (e.g., channel 14) between proof mass 112 and support structure 120 to support and isolate proof mass 112 from forces placed on support structure 120 from raised pads 116A-116D. In the example of FIG. 5A, the channels of proof mass 112 and raised pads 116A-116D are created by processing material 101A with a carbon-dioxide laser until there is no material left of material 101A leaving an open space in accelerometer 100A. Although support structure 120 as shown in FIG. 5A is a circular shape, it is contemplated that support structure 120 may be any shape (e.g., square, rectangular, oval, or the like).

FIGS. 4B and 5B are illustrating examples of material 101B in the process of forming accelerometer 100, in accordance with the techniques described herein. FIGS. 4B-5B are described with respect to FIG. 2. In the example of FIG. 4B, accelerometer 100B may be masked with one or more photoresists to define (e.g., outline the structure) support structure 103B, interior of support structure 105B, and areas 102B-108B. Support structure 103B may have a mask which allows for a shallow acid etch. In some examples, the photoresist mask defining support structure 103B may be a silk screen vinyl material. Interior of support structure 105B may have a mask which allows for a deep acid etch. In some examples, the photoresist mask defining interior of support structure 105B may be a silicon rubber material, which may be punched to define (e.g., outline the structure) the plurality of features. Areas 102B-108B may be the location of a plurality of raised pads (e.g., raised pads 26A-26D). In some examples, areas 102B-108B may have a mask that prevents or at least significantly limits any acid etch. In some examples, accelerometer 100B with the photoresist masks defining support structure 103B, interior of support structure 105B, and areas 102B-108B, may be exposed to acid to remove (e.g., etch) material from accelerometer 100B. Removing a material from accelerometer 100 forms a thickness of support structure 103B (e.g., around twenty-nine thousandths of an inch), a thickness of interior of support structure 105B (e.g., around one thousandths of an inch), and a thickness of areas 102B-108B (e.g., around thirty thousandths of an inch) which may be the combined height of the plurality of raised pads on both sides of the proof mass.

In the example of FIG. 5B, accelerometer 100B may be placed in a fixture and a carbon-dioxide laser may be programmed to process a plurality of features on material 101B, which may include proof mass 122, flexures 124A and 124B, raised pads 126A-126D, and support structure 130, and correspond to proof mass 22, flexures 24, raised pads 26A-26D, and support structure 30 respectively as described in FIG. 2. In other examples, material 101B may have a photoresist masking the plurality of features to be developed and etched to remove (e.g., etch) material from material 101B to form accelerometer 100B (e.g., accelerometer 20) with the plurality of features. For example, accelerometer 100B may be exposed to be developed and etched to form proof mass 122, flexures 124A and 124B, raised pads 126A-126D, and support structure 130, which may correspond to proof mass 22, flexures 24, raised pads 26A-26D, and support structure 30 respectively as described in FIG. 2.

In the example of FIG. 5B, raised pads 126A-126D may further include a pair of pad flexures which may correspond to pad flexures 28A-28H as described in FIG. 2, and a channel between raised pads 126A-126D and support structure 130 to isolate raised pads 126A-126D from support structure 130, flexures 124A and 124B, and proof mass 122. In the example of FIG. 5B, proof mass 122 may be connected to support structure 130 by flexures 124A and 124B, which may correspond to flexures 4 as described in FIG. 1, and a channel (e.g., channel 34) between proof mass 122 and support structure 130 to support and isolate proof mass 122 from forces placed on support structure 130 from raised pads 126A-126D. In the example of FIG. 5B, the channels of proof mass 122 and raised pads 126A-126D are created by processing material 101B with a carbon-dioxide laser until there is no material left of material 101B leaving an open space in accelerometer 100B. Although support structure 130 as shown in FIG. 5B is a circular shape, it is contemplated that support structure 130 may be any shape (e.g., square, rectangular, oval, or the like).

Figure 6:
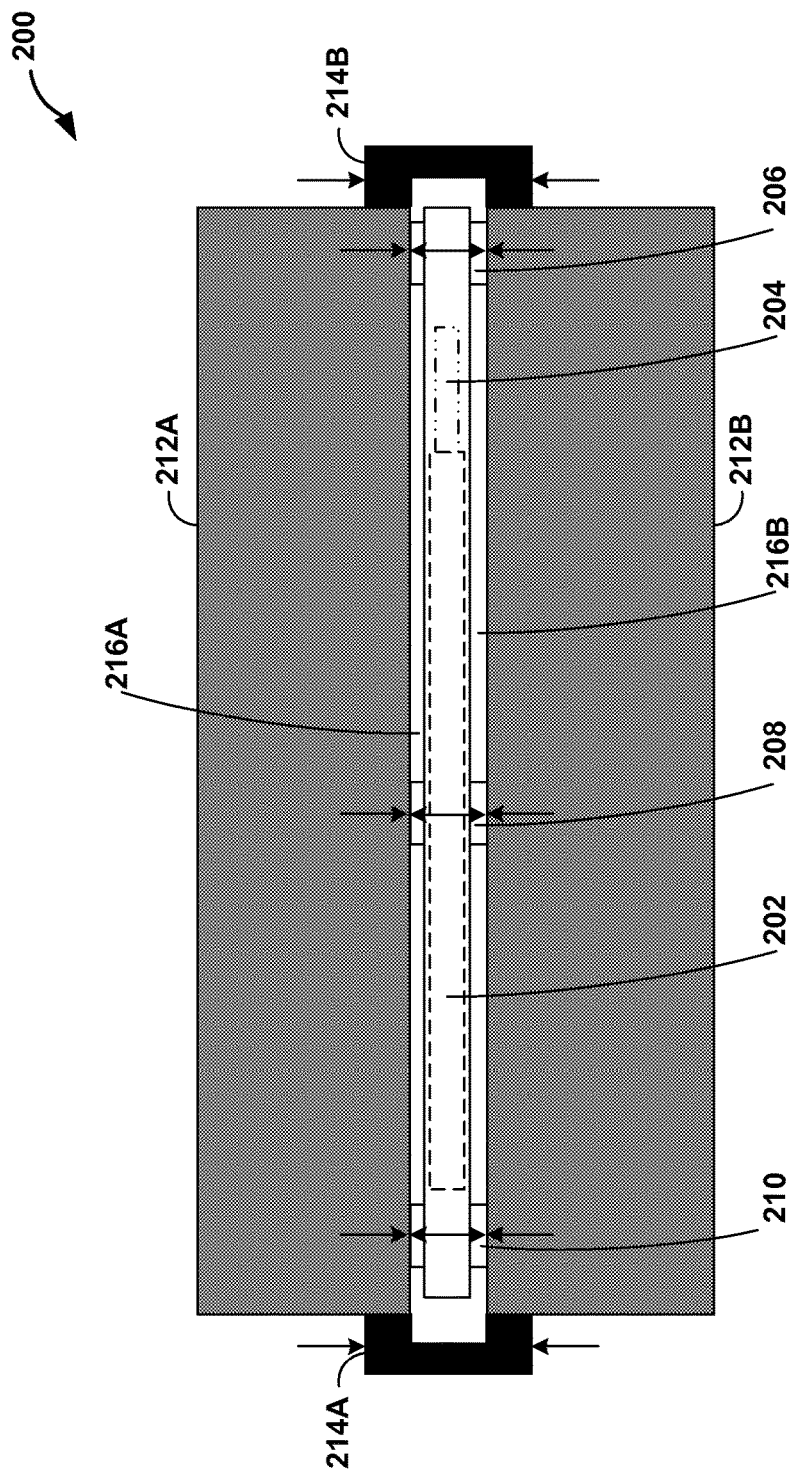
FIG. 6 is a conceptual diagram illustrating a cutaway view of an accelerometer assembly with forces and/or strains caused during construction.

FIG. 6 is a conceptual diagram illustrating a cutaway view of an example accelerometer assembly 200 with forces and/or strains caused during construction. In the example of FIG. 6, accelerometer assembly 200 includes proof mass 202, flexures 204, raised pads 206-210, stators 212A and 212B, bellybands 214A and 214B, and capacitive gap 216.

Proof mass 202, flexures 204, raised pads 206-210 may correspond to proof mass 2, flexures 4, and raised pads 6A-6D as described in FIG. 1.

Stators 212A and 212B (collectively "stators 212") are stators, which may be attached to (e.g., clamped) raised pads 206-210 of the accelerometer. In some examples, stators 212 are dual metal parts, which contain magnets. In some examples, there may be only a single stator, for example, either stators 212A or 212B, which may contain a single magnet.

Bellybands 214A and 214B (collectively "bellyband 214") is a single metal piece which is a hoop-like structure with a slot in it which surrounds the exterior of stators 212, which may be attached to (e.g., bonded with epoxy) stators 212, when stators 212 are clamped to the accelerometer. Capacitive gaps 216A and 216B (collectively "capacitive gaps 216") are gaps between proof mass 202 and stators 212B defined by raised pads 206-210, which are the height of raised pads 206-210 (e.g., around one thousandths of an inch on either side of proof mass 202). In some examples, each capacitive gap 216 may have a capacitance value. The electronics (not shown) may detect the capacitance value of capacitive gap 216, which in a closed-loop differential capacitance configuration can be detected and used by the electronics (not shown) to determine the acceleration of accelerometer assembly 200. For example, the increase in capacitive gap 216A and the decrease in capacitive gap 216B may be indicative of an acceleration applied to accelerometer assembly 200. Conversely, the decrease in capacitive gap 216B and the increase in capacitive gap 216B may be indicative of an acceleration applied to accelerometer assembly 200.

In some examples, accelerometer assembly 200 may include force-rebalancing coils (not shown) attached on each side of proof mass 202. In some examples, accelerometer assembly 200 may include electronics (not shown) that servo the force-rebalancing coils to position proof mass 202 at a null position. In some examples, when acceleration is applied to accelerometer assembly 200, the electronics may increase the current in the force-rebalancing coils to maintain proof mass 202 at the null position. In this example, the increase in current is proportional to the amount of acceleration applied to accelerometer assembly 200.

In the example of FIG. 6, forces and/or strains (e.g., clamping forces and/or thermal strains) as indicated by the single arrows are produced during construction of accelerometer assembly 200. For example, stators 212 may be clamped onto the accelerometer, which may place forces on raised pads 206-210, and raised pads 206-210 may support the forces as indicated by the double arrows. In this example, after clamping stators 212 to the accelerometer, bellyband 214 may be attached (e.g., bonded by an epoxy) to stators 212 in order to hold stators 212 in place. To cure the epoxy between stators 212 and bellyband 214, accelerometer assembly 200 is heated.

In some examples, as accelerometer assembly 200 is heated to a temperature to cure the epoxy. The thermal expansion coefficients are different between bellyband 214, stators 212, the epoxy, and the other materials in accelerometer assembly 200. The thermal expansion coefficients mismatch causes the different materials to expand and contract at different rates. In some examples, the thermal strains from heating accelerometer assembly 200, cause stators 212 to expand radially outward. The radial expansion of stators 212 places forces on raised pads 206-210 (not shown) as stators 212 expand outward. In some examples, raised pads 206-210 may isolate and/or reduce the forces by flexing, while maintaining capacitive gaps 216 between the accelerometer and stators 212.

In some examples, as accelerometer assembly 200 cools after being heated to a temperature to cure the epoxy, the different thermal coefficients between bellyband 214, stators 212, the epoxy, and the other materials in accelerometer assembly 200, cause the different components of accelerometer assembly 200 to compress at different rates. In some examples, the strains caused by cooling accelerometer assembly 200 may compress stators 212, and in particular, bellyband 214 may compress stators 212 onto raised pads 206-210 as illustrated by the single arrows at bellybands 214A and 214B. The compression during cooling places forces on raised pads 206-210, which may be indicated by the single arrows in stators 212, as stators 212 are compressed together. In some examples, raised pads 206-210 may support the compression forces, which may be indicated by the double arrows, while maintaining capacitive gaps 216 between the accelerometer and stators 212. In some examples, raised pad 206 may degrade the functionality of the accelerometer if present after accelerometer assembly 200 is constructed.

In some examples, without raised pad 206, raised pads 208-210 may act as a cantilever on stators 212, allowing stators 212 to bend inward toward the proof mass. In this example, without raised pad 206 during construction, the forces and/or strains placed on stators 212 during construction may cause stators 212 to be slightly bent as accelerometer assembly 200 cools. In some examples, the bend in stators 212 may alter capacitive gaps 216 causing errors in the determination of an acceleration of accelerometer assembly 200. In some examples, the bend in stators 212 may require a calibration of accelerometer assembly 200 after construction.

In some examples, stators 212 and bellyband 214 may be comprised of invar which has a thermal expansion coefficient of 2 parts-per-million (ppm) per degree centigrade. However, quartz, which the accelerometer may be composed of, has 0.55 ppm per degree centigrade thermal expansion coefficient. The difference in the thermal expansion coefficients between invar and quartz affects accelerometer assembly 200 when the temperature goes up, causing the metal parts (e.g., stators 212, capacitor plates, etc.) that comprise the magnetic return path to expand faster than the quartz putting a strain on the support structure. In some examples, raised pads 208-210 may slip without raised pad 206 when the strain is applied causing a hysteresis if the accelerometer is not realigned. In some examples, raised pads 206-210 may be able to flex with respect to stators 212 so raised pads 206-210 may travel with stators 212 and the support structure remains while the deflection takes place occurs on the pad flexures which attach raised pads 206-210 to the support structure. In some examples, using raised pads 206-210 during the construction process may allow the expansion of stators 212 to cause less stress on the support structure and may prevent the change in capacitive gaps 216 from the difference in thermal coefficients. In some examples, using raised pads 206-210 during construction may provide a more stable capacitance measurement after construction than only using raised pads 208-210 during construction. In some examples, raised pad 206 adds additional friction to prevent the slippage associated with only three raised pads.

Figure 7:
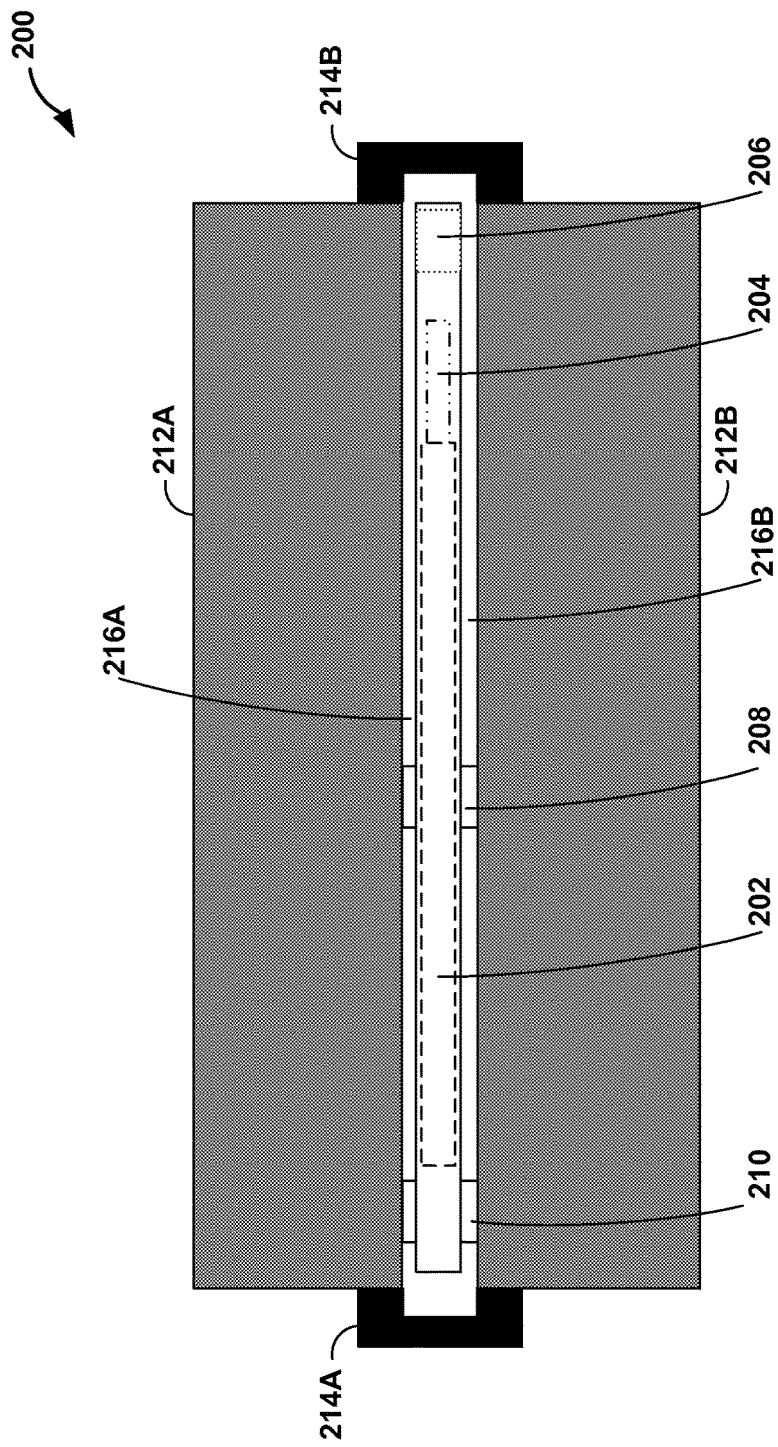
FIG. 7 is a conceptual diagram illustrating a cutaway view of an accelerometer assembly after construction and a raised pad has been removed.

FIG. 7 is a conceptual diagram illustrating an example cutaway view of accelerometer assembly 200 after the assembly has cooled and raised pad 206 has been removed. In the example of FIG. 7, accelerometer assembly 200 includes proof mass 202, flexures 204, raised pads 208-210, stators 212A and 212B, bellybands 214A and 214B, and capacitive gaps 216A and 216B as described in FIG. 6.

In the example of FIG. 7, raised pad 206 as described in FIG. 6 has been isolated (e.g., removed) after the forces and/or strains during construction of accelerometer assembly 200 have dissipated. In some examples, removing raised pad 206 may provide further isolation of proof mass 2 and flexures 4 from any other forces and/or strains produced by stators 212 near bellyband 214B. In some examples, raised pad 206 may be isolated by a laser. In other examples, raised pad 206 may be isolated by clipping raised pad 206. In some examples, a portion of the support structure (e.g., zone 12 of support structure 10 as described in FIG. 1) may have been removed (e.g., by a laser or clipping by a mechanical means) to allow access to raised pad 206. In some examples, raised pad 206 may be isolated by breaking or clipping the pad flexures of raised pad 206. In some examples, by isolating raised pad 206 the pad flexures may remain with the support structure, and only raised pad 206 may be isolated (e.g., removed).

In some examples, capacitor plates (not shown) are C-shaped and may be deposited via vapor deposition to the top and bottom of proof mass 202 and electronics (not shown) close a loop with the capacitance plates (not shown). In some examples, the C-shaped geometry of the capacitor plate provides a center of capacitance, so if the capacitor plate is tilted, then the capacitor plate is less sensitive as the capacitance increases at a first end of the C-shape and decreases at a second end of the C-shape. In some examples, displacement of proof mass 202 causes a change in capacitance between the top capacitor plate and the bottom capacitor. In some examples, the change in capacitance between the top and bottom capacitor plates may be used by electronics to determine the acceleration of accelerometer assembly 200.

Additionally, coil forms with force-rebalance coils may be mounted on either side of the proof mass. In some examples, the electronics modify the current in the force-rebalance coils to servo the proof mass to maintain a null position. Any acceleration of accelerometer assembly 200 will move proof mass 202 out of the plane defined by the support structure and the increase in current required to maintain proof mass 202 in the null position is proportional to the amount of accelerometer assembly 200 experiences.

In some examples, an accelerometer assembly device (e.g., accelerometer assembly 200) comprises an accelerometer positioned between a first stator and a second stator (e.g., stator 212A and stator 212B), and the accelerometer comprises a plurality of features. In some examples, the plurality of features include a proof mass (e.g., proof mass 202), a support structure defining a plane and configured to support the proof mass, a flexure (e.g., flexure 204) configured to flexibly connect the proof mass to the support structure, a plurality of raised pads (e.g. raised pads 208 and 210), a bellyband (e.g., bellyband 214) attached to the first stator and the second stator, and a zone (e.g., isolated and/or removed raised pad 206) between the flexure and an exterior of the support structure, and the zone isolates (e.g., prevents contact) the accelerometer from the first stator and the second stator. In some examples, the zone may be created by at least one of clipping or breaking a pad flexure of the at least one raised pad. In some examples, the zone may be created by removing a portion of the support structure. In some examples, the first stator and the second stator may be clamped onto the accelerometer. In some examples, the bellyband may be attached by bonding the bellyband on the first stator and the second stator with epoxy.

Figure 8:
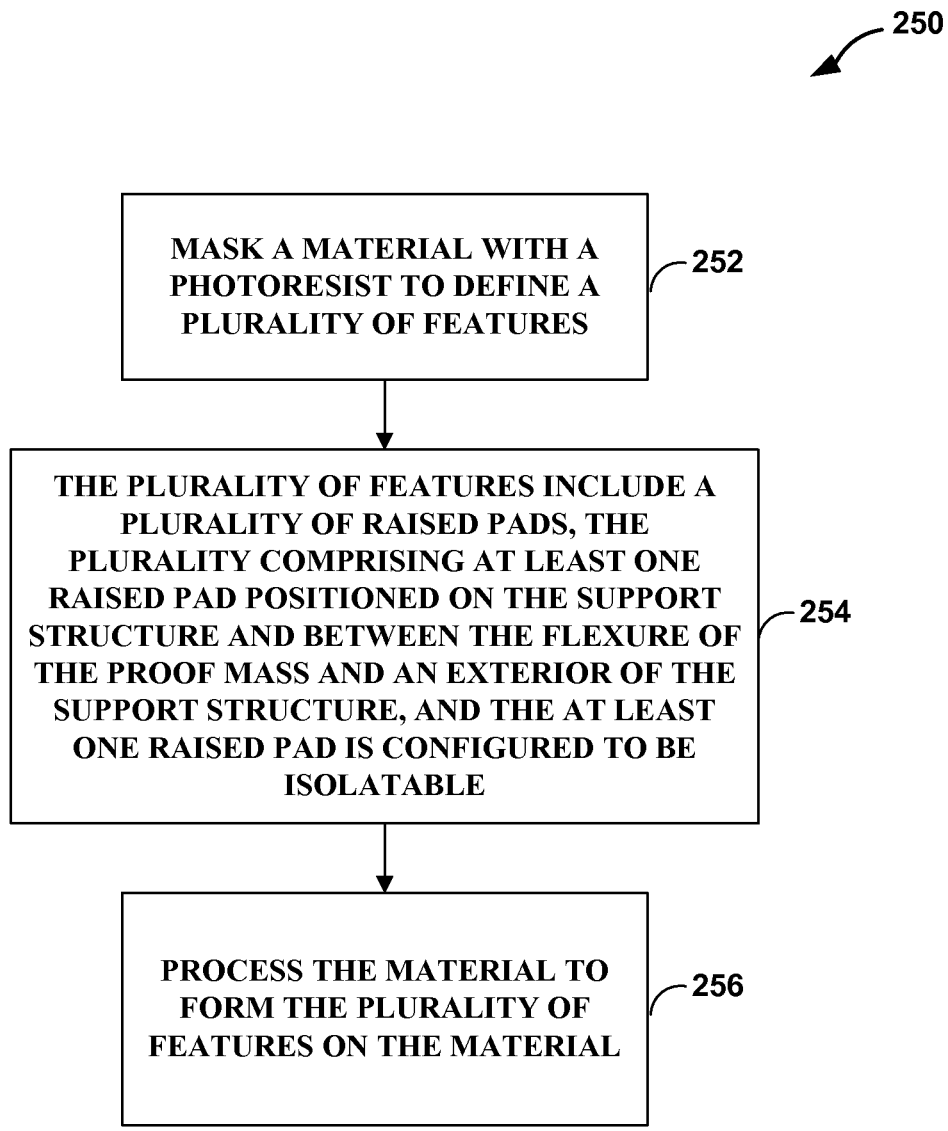
FIG. 8 is a flow chart illustrating example operations for manufacturing an accelerometer, in accordance with the technique described herein.

FIG. 8 is a flow chart illustrating example operations for manufacturing an accelerometer, in accordance with the technique described herein. FIG. 8 is described with respect to FIGS. 4A and 5A, and 4B and 5B. In the example of FIGS. 4A and 5A, material 101A is masked with a photoresist to define a plurality of features (252). In some examples, the plurality of features includes a proof mass 112, support structure 120 defining a plane and configured to support proof mass 112, flexure 114 configured to flexibly connect proof mass 112 to support structure 120, and plurality of raised pads 116A-116D including at least one raised pad (e.g., raised pad 116A) positioned on support structure 120 and between flexure 114 of proof mass 112 and an exterior of support structure 120, and the raised pad 116A is configured to be isolatable (254). In the example of FIG. 5A, material 101A is processed to form the plurality of features on material 101A (256).

In some examples, masking material 101A with a photoresist comprises first mask 103A and second mask 105A, wherein first mask 103A defines support structure 120, and second mask 105A defines the interior of support structure 120. In some examples, first mask 103A may include a silk screen vinyl material, and second mask 105A may have a silicon rubber material. In some examples, processing material 101A may include etching a quartz substrate in an acid bath. In some examples, processing material 101A may include processing a quartz substrate with a carbon dioxide laser. In some examples, raised pad 116A is configured to be isolated by a carbon dioxide laser.

In the example of FIGS. 4B and 5B, material 101B is masked with a photoresist to define a plurality of features (252). In some examples, the plurality of features includes a proof mass 122, support structure 130 defining a plane and configured to support proof mass 122, flexure 124 configured to flexibly connect proof mass 122 to support structure 130, and plurality of raised pads 126A-126D including at least one raised pad (e.g., raised pad 126A) positioned on support structure 130 and between flexure 124 of proof mass 122 and an exterior of support structure 130, and the raised pad 126A is configured to be isolatable (254). In the example of FIG. 5B, material 101B is processed to form the plurality of features on material 101B (256).

In some examples, masking material 101B with a photoresist comprises first mask 103B and second mask 105B, wherein first mask 103B defines support structure 130, and second mask 105B defines the interior of support structure 130. In some examples, first mask 103B may include a silk screen vinyl material, and second mask 105B may have a silicon rubber material. In some examples, processing material 101B may include etching a quartz substrate in an acid bath. In some examples, processing material 101B may include processing a quartz substrate with a carbon dioxide laser. In some examples, raised pad 126A is configured to be isolated by a carbon dioxide laser.

Figure 9:
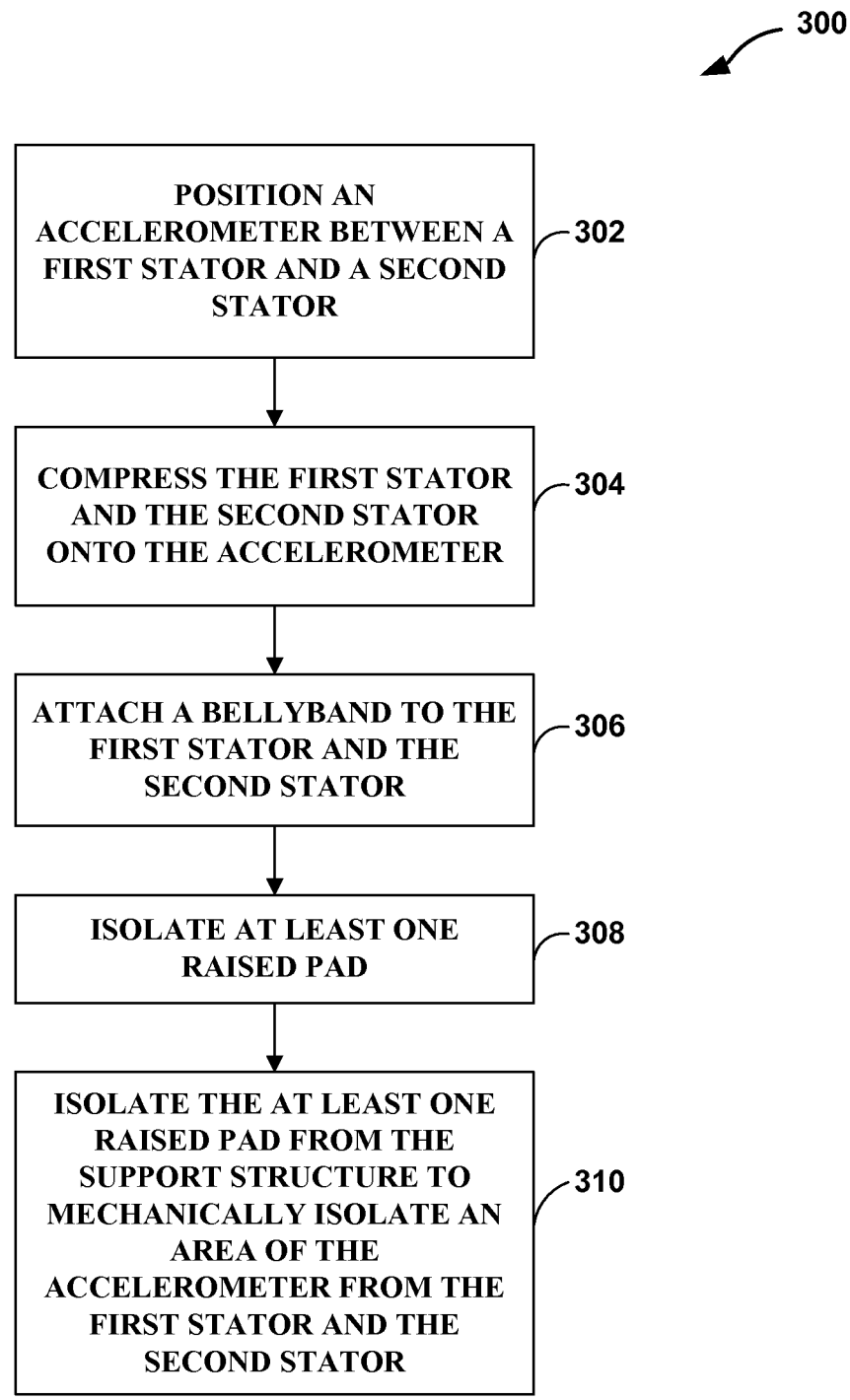
FIG. 9 is a flow chart illustrating example operations for manufacturing an accelerometer assembly, in accordance with the technique described herein.

FIG. 9 is a flow chart illustrating example operations for manufacturing an accelerometer assembly, in accordance with the technique described herein. FIG. 9 is described with respect to FIGS. 6-7. In the example of FIG. 9, an accelerometer is positioned between first stator 212A and second stator 212B, and the accelerometer includes a plurality of features (302). In some examples, the plurality of features include a proof mass, a support structure defining a plane and configured to support the proof mass, a flexure configured to flexibly connect the proof mass to the support structure, and a plurality of raised pads, the plurality comprising at least one raised pad positioned between the flexure and an exterior of the support structure, and the at least one raised pad is configured to be isolatable. In the example of FIG. 9, first stator 212A and second stator 212B are compressed onto the accelerometer (304), and bellyband 214 is attached to first stator 212A and second stator 212B (306). In the example of FIG. 9, the at least one raised pad is isolated (308). For example, raised pad 206 as described in FIG. 7 may be removed from accelerometer assembly 200.

In some examples, isolating the at least one raised pad 206 from the support structure may mechanically isolate an area of the accelerometer from first stator 212A and second stator 212B (310). In some examples, isolating the at least one raised pad 206 may include at least one of clipping or breaking a pad flexure of the at least one raised pad 206. In some examples, isolating the at least one raised pad 206 may include removing a portion of the support structure. In some examples, compressing first stator 212A and second stator 212B may further include clamping first stator 212A and second stator 212B onto the accelerometer. In some examples, attaching bellyband 214 may further include bonding bellyband 214 on first stator 212A and second stator 212B with epoxy.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A device comprising:
   a proof mass;
   a support structure surrounding the proof mass, defining a plane, and configured to support the proof mass;
   a flexure connecting the proof mass to the support structure, wherein the flexure allows the proof mass to move about the plane defined by the support structure;
   at least four raised pads arranged on a common surface of the support structure, wherein at least one raised pad is positioned between the flexure and an exterior of the support structure, and wherein the at least one raised pad is configured to be isolatable; and
   two pad flexures connected to the common surface of the support structure and the at least one raised pad, wherein the two pad flexures are configured to be removable,
   wherein the device is comprised of a monolithic material.

2. The device of claim 1, wherein each raised pad of the at least four raised pads is connected to the support structure by at least two pad flexures.

3. The device of claim 2, wherein each pad flexure is connected to a respective raised pad at a respective location of the respective raised pad, and wherein the respective location is based on a proximity of the respective raised pad to the flexure.

4. The device of claim 2, wherein the at least one raised pad of the at least four raised pads includes a first raised pad, and wherein two pad flexures are connected to a second raised pad of the at least four raised pads between a middle of the second raised pad and the support structure.

5. The device of claim 1, wherein the accelerometer comprises a circular shape, and wherein the two pad flexures are thin in a radial direction of the accelerometer and stiff in a circumferential direction and a vertical direction of the accelerometer.

6. The device of claim 1, wherein the two pad flexures further include a first pad flexure and a second pad flexure.

7. The device of claim 1, wherein the two pad flexures are connected to the at least one raised pad between a corner of the at least one raised pad and the support structure.

8. The device of claim 1, wherein the two pad flexures are connected to the at least one raised pad and an exterior of the support structure.

9. A device comprising:
- a proof mass;
- a support structure surrounding the proof mass, defining a plane, and configured to support the proof mass;
- a flexure connecting the proof mass to the support structure, wherein the flexure allows the proof mass to move about the plane defined by the support structure; and
- a plurality of raised pads arranged on a common surface of the support structure, wherein at least one raised pad of the plurality of raised pads is configured to be isolatable; and
- two pad flexures connected to the common surface of the support structure and the at least one raised pad, wherein the two pad flexures are configured to be removable,
- wherein the device is comprised of a monolithic material.

* * * * *